(12) United States Patent
Ekkelenkamp

(10) Patent No.: US 8,298,300 B2
(45) Date of Patent: Oct. 30, 2012

(54) PROCESS FOR CONTINUOUS PRODUCTION OF LARGE CRYSTAL PRODUCTS

(75) Inventor: Geert Ekkelenkamp, JH Born (NL)

(73) Assignee: DSM IP Assets B.V., Heerlen (NL)

( * ) Notice: Subject to any disclaimer, the term of this patent is extended or adjusted under 35 U.S.C. 154(b) by 726 days.

(21) Appl. No.: 12/375,259

(22) PCT Filed: Jul. 19, 2007

(86) PCT No.: PCT/EP2007/006429
§ 371 (c)(1),
(2), (4) Date: Aug. 28, 2009

(87) PCT Pub. No.: WO2008/012026
PCT Pub. Date: Jan. 31, 2008

(65) Prior Publication Data
US 2010/0024172 A1    Feb. 4, 2010

(30) Foreign Application Priority Data
Jul. 28, 2006   (EP) .................................... 06015759

(51) Int. Cl.
*B01J 2/16*   (2006.01)
(52) U.S. Cl. ..................... 23/313 FB; 23/301
(58) Field of Classification Search ............ 23/301, 23/295 R, 296, 313 FB
See application file for complete search history.

(56) References Cited

U.S. PATENT DOCUMENTS

| | | |
|---|---|---|
| 3,383,180 A | 5/1968 | Kralik et al. |
| 3,758,565 A | 9/1973 | Agee et al. |
| 4,263,010 A | 4/1981 | Randolph |
| 2006/0031997 A1 | 2/2006 | Berard |

FOREIGN PATENT DOCUMENTS

| | | |
|---|---|---|
| WO | 93/19826 | 10/1993 |
| WO | 01/91874 | 12/2001 |

OTHER PUBLICATIONS

International Search Report for PCT/EP2007/006429, mailed Nov. 15, 2007.
Written Opinion of the International Searching Authority for PCT/EP2007/006429, mailed Nov. 15, 2007.

*Primary Examiner* — Edward Johnson
(74) *Attorney, Agent, or Firm* — Nixon & Vanderhye P.C.

(57) ABSTRACT

The invention relates to a continuous process for preparing large crystal products of a crystalline product in a fluid bed crystallizer, said fluid bed crystallizer comprising a crystallization vessel and means for mechanically impacting of crystals; and connected to the crystallization vessel (i) a feed line; (ii) an external circulation circuit comprising means for determining properties of the slurry in the external circulation circuit and a heat exchanger; and (iii) a product withdrawal line, wherein—for any specific crystalline product and at any flow rate chosen in the external circulation circuit—the weight percentage of crystals of the crystalline product in the slurry in the external circulation circuit, ECCWPC, is controlled by said means for determining properties of the slurry within a specified and predetermined narrow range having a maximum and minimum value not more apart than at most 25% by weight and falling within the range of from 1 to 50% by weight. Preferably, the crystalline product is ammonium sulphate, and the ECCWPC is controlled within a range of from 3 to 20% by weight, preferably of from 5 to 15% by weight, more preferably of from 8 to 12% by weight. The product obtained may be further subjected to size classification by screening.

19 Claims, 2 Drawing Sheets

PROCESS FOR CONTINUOUS PRODUCTION OF LARGE CRYSTAL PRODUCTS

This application is the U.S. national phase of International Application No. PCT/EP2007/006429, filed 19 Jul. 2007, which designated the U.S. and claims priority to European Application No. 06015759.1, filed 28 Jul. 2006, the entire contents of each of which are hereby incorporated by reference.

FIELD

The invention relates to a continuous process for preparing large crystal products of a crystalline product in a fluid bed crystallizer, said fluid bed crystallizer comprising a crystallization vessel and means for mechanically impacting of crystals; and connected to the crystallization vessel (i) a feed line; (ii) an external circulation circuit comprising means for determining properties of the slurry in the external circulation circuit and a heat exchanger; and (iii) a product withdrawal line. As meant herein, the term "product withdrawal line" refers to the line where the final product from the crystallization is discharged from the crystallizer at a position not connected to the external circulation circuit.

BACKGROUND AND SUMMARY

The term "large crystal products" as meant herein, does not intend to reflect any absolute value or value range as such, but—in the context of this application—it always is related to a predetermined average crystal size (generally measured along the crystal diameter) for any particular crystalline product prepared. For crystals of each specific product to be called a "large crystal product" in the meaning of this application, accordingly, the predetermined average crystal size should be within a certain range of minimum and maximum diameter ($d_{min}$ and $d_{max}$), for instance of between 1 and 5 mm of diameter. Moreover, the percentages of crystals of the crystalline product prepared, and having a diameter smaller than $d_{min}$, respectively larger than $d_{max}$, preferably should not exceed a specific value as will be determined by the product specifications. Generally such percentages of crystals having a diameter smaller than $d_{min}$, respectively larger than $d_{max}$, will be at most 20% by weight of the crystal product, and more preferably both are at most 15% by weight, even more preferably both are at most 10% by weight, most preferably at most 5% by weight. Simultaneously, the percentage of crystals having a diameter in the range between $d_{min}$ and $d_{max}$ will generally be at least 60% by weight, more preferably at least 70% by weight, even more preferably at least 80% by weight and most preferably at least 90% by weight. If, for a specific product, the combination of these criteria (namely the criteria (i) average crystal size within range of $d_{min}$ to $d_{max}$; (ii) percentages of crystals smaller than $d_{min}$, respectively larger than $d_{max}$; and (iii) percentage of crystals in the range between $d_{min}$ and $d_{max}$) is not met in the widest sense (i.e. at most 20% by weight for each of the smaller than, respectively larger than, aspects of (ii); and at least 60% by weight for (iii)), then the product cannot be referred to as a "large crystal product" in the sense of this application.

For crystalline ammonium sulphate, for instance, the crystals of the market specifications for the large crystal product have an average crystal diameter in the range of from $d_{min}=1.0$ mm to $d_{max}=3.5$ mm, and meet the criteria of (ii) and (iii). If these crystals tend to have a big and rough appearance, they also may be called granular, even if they have been obtained by crystallization and not by any of the granulation techniques known to the skilled man. Ammonium sulphate large crystal products are particularly suitable for use in fertilizers. Market specifications of ammonium sulphate large crystal products may be different depending on the market where the product is used. For instance, in the European market, specifications for ammonium sulphate large crystal products are such that at most 10% by weight has a crystal diameter smaller than 1.4 mm, respectively at most 10% by weight has a crystal diameter larger than 3.35 mm, with the proviso that at least 90% by weight has a diameter in the range of from 1.4 to 3.35 mm. For the USA market the average value of the ammonium sulphate large crystal products generally may be somewhat smaller than in Europe; in the USA at most 10% by weight has a crystal diameter smaller than 1.0 mm. Nevertheless, in the context of this application, large crystal products of ammonium sulphate are already such products (though being outside the criteria of the market specifications) which meet the abovementioned combination of the criteria of (i) average crystal size within range of $d_{min}$ to $d_{max}$; and (ii) percentages of crystals smaller than $d_{min}$, respectively larger than $d_{max}$; and (iii) percentage of crystals in the range between $d_{min}$ and $d_{max}$ in the widest sense. Narrower specification ranges then can be met by subjecting the large crystal product to a subsequent sieving step.

Weight percentages of crystals below a certain diameter (or conversely above a certain diameter) can be determined according to standard methods known to the skilled man, e.g. by sieving crystalline products over screens having different mesh size openings. See for instance the techniques described in Perry's Chemical Engineers Handbook, 6th edition, 1984, pages 21-13 until and including 21-18.

As used in this application, the term "fluid bed crystallizer" intends to describe any type of crystallizer wherein the crystal slurry present is not homogeneously mixed throughout all of the liquid contents of the crystallizer. Accordingly, solids are not evenly spread throughout the height of the liquid column in the crystallizer. Generally some kind of "crystal bed" can be observed in these crystallizers, i.e. a part of the volume of the liquid contents of the crystallizer containing almost all of the crystals in the crystallizer (this is the lower part of the crystallizer liquid content); another part of the volume of the liquid contents of the crystallizer (this is the top part of the crystallizer liquid content) contains only very few crystals. In normal operation of a fluid bed crystallizer, external circulation is carried out from this top part of the crystallizer content, thereby providing an external circulation stream which generally is (almost) crystal-free. The height of the crystal bed (in cm) in the crystallizer is calculated from the bottom of the crystallizer till the level of the boundary surface between the part of the volume of the liquid contents of the crystallizer containing almost all of the crystals and the part of the volume of the liquid contents of the crystallizer containing only very few crystals. Various types of fluid bed crystallizers are known to the skilled man, for instance so-called Oslo-crystallizers and Krystal-crystallizers as are described in Crystallization, Third Edition, pages 338, 345 and 351, by J. W. Mullin, Butterworth-Heinemann (1993).

Further, as used in this application, the term "means for mechanically impacting of crystals" indicates any type of apparatus, equipment or part thereof which leads to attrition of crystals by forced collision against solid surface areas or by treatment in the equipment. Such solid surface areas may be moving parts, for instance stirrer blades or crushing plates, or may have fixed positions, such as, for instance, collision plates, baffles, etc.

The present invention, in particular, relates to a continuous process for preparing of ammonium sulphate large crystal products.

Such process, particularly for the production of ammonium sulphate crystal products, is described in Japanese patent application JP 2000 072436 ('436). This document describes continuous crystallization of ammonium sulphate in a stirred crystallization vessel, for instance, in a DTB (Draft Tube Baffled) crystallizer (as shown in FIG. 1 of said document), and is aimed at the production of big and rough crystals of ammonium sulphate. It is to be noted, that in the DTB crystallizer embodiments of '436 only small crystals are brought into (external) circulation through a heat exchanger after classifying as to crystal size in a classifying zone, and water is added to ensure dissolution of the small crystals. In '436 control of slurry properties in the external circulation circuit (comprising a pump) is done by determining the particle size distribution (PSD) in the crystallizer, or of the slurry concentration in the external circulation line, by means of sampling at regular intervals of time. It is to be noted, that the mechanism shown in '436 works for DTB-type crystallizers, but is not applicable in Oslo-type crystallizers for obtaining a stable average crystal size (in particular as to crystal diameter). It is, however, a disadvantage of the method of '436 that undesirable strong fluctuation of particle size distribution occurs over time. Use of a DTB crystallizer for the production of large crystals is also described in, for instance, WO 01/91874 ('174) or WO 93/19826 ('826). Control of the operation of such crystallizer in '174 or '826 is, similarly to the '436 process, achieved by means of dissolution of fine crystals in the external circulation circuit in order to obtain larger crystals on average, while keeping the weight of crystallized material in the crystallizer at a constant level. It is further to be noted, that '174 incorrectly also mentions that the process of '174 also could be operated in fluid bed crystallizers. Such process, however, then still would require the dissolution of fine crystals in the external circulation circuit.

Another process for the production of ammonium sulphate crystal products is known from JP-A-63103821. This document describes a complicated process for the production of ammonium sulphate large crystal products wherein the share of ammonium sulphate crystals above a predetermined crystal size is increased by adding fine ammonium sulphate crystals, i.e. crystals below a predetermined size, to the suspended crystal mass as seed crystals. In the said known process the fine ammonium sulphate crystals are obtained in a process which involves withdrawing a product slurry which comprises the ammonium sulphate solution from the crystallization vessel, separating the ammonium sulphate product crystals from the ammonium sulphate solution, for instance by using a centrifuge, drying the separated ammonium sulphate product crystals, and size classifying the dried ammonium sulphate product crystals to obtain a fraction of ammonium sulphate product crystals above a predetermined size and a fraction of fine ammonium sulphate crystals below a predetermined size. Thus, the fine ammonium sulphate crystals are obtained by separating them as such from the final product. The dried fine ammonium sulphate crystals are then added to the suspended crystal mass in the crystallization vessel by means of a dosing apparatus with which the rate at which the dried fine ammonium sulphate crystals are added may be varied and controlled by adjusting the opening and closing time of the dosing apparatus. In the said known process the need for fine ammonium sulphate crystals in the suspended crystal mass is determined by determining the size distribution of the dried ammonium sulphate product crystals. It is described that the addition of the fine ammonium sulphate product crystals is preferably started at the moment that the share of crystals above the predetermined size starts to increase and that the addition is stopped when this share has reached a maximum and start to decline. Although in the process of '821 an external circulation circuit may be present for ensuring heat transfer into the crystallization vessel, there is no controlling of properties of the slurry in the external circulation circuit.

A major disadvantage of this known process is that the dried fine ammonium sulphate crystals tend to stick to each other, if no special precautions are taken to avoid contact of the fine ammonium sulphate crystals with moisture. Moreover, dosing of fine ammonium sulphate crystals and varying the rate at which fine ammonium sulphate crystals are added, is cumbersome due to such sticking to each other. Furthermore, clusters of fine ammonium sulphate crystals, which are sticking to each other, are not effective as seed crystals.

It is a goal of the invention to provide a process for obtaining large crystal products, having stable average crystal size at a predetermined large value of average crystal diameter, without problems of sticking, and wherein large crystal products are produced continuously in highest possible amounts, so that—if necessary by means of a subsequent sieving step— high yields of large crystal product meeting market specifications can be obtained. More particularly, the aim of the present invention is to provide a continuous process for preparing large crystal products of a large crystal product in a fluid bed crystallizer, said fluid bed crystallizer comprising a crystallization vessel and means for mechanically impacting of crystals; and connected to the crystallization vessel (i) a feed line; (ii) an external circulation circuit comprising means for determining properties of the slurry in the external circulation circuit and a heat exchanger; and (iii) a product withdrawal line.

Surprisingly, this goal is achieved in that for any specific crystalline product and at any flow rate chosen in the external circulation circuit, the weight percentage of crystals of the crystalline product in the slurry in the external circulation circuit before the heat exchanger, is controlled by said means for determining properties of the slurry within a specified and predetermined narrow range having a maximum and minimum value not more apart than at most 25% by weight and falling within the range of from 1 to 50% by weight. As meant herein, the term "controlled" means that the actually obtained results from the determination of properties of crystals in the external circulation circuit before the heat exchanger are used to establish the weight percentage of such crystals at any time during the process, and to take action for keeping said weight percentage within a predetermined range. The control, by methods explained below in more detail, thereby ensures that the said weight percentage will not go beyond such predetermined range.

DETAILED DESCRIPTION

Figure 1:
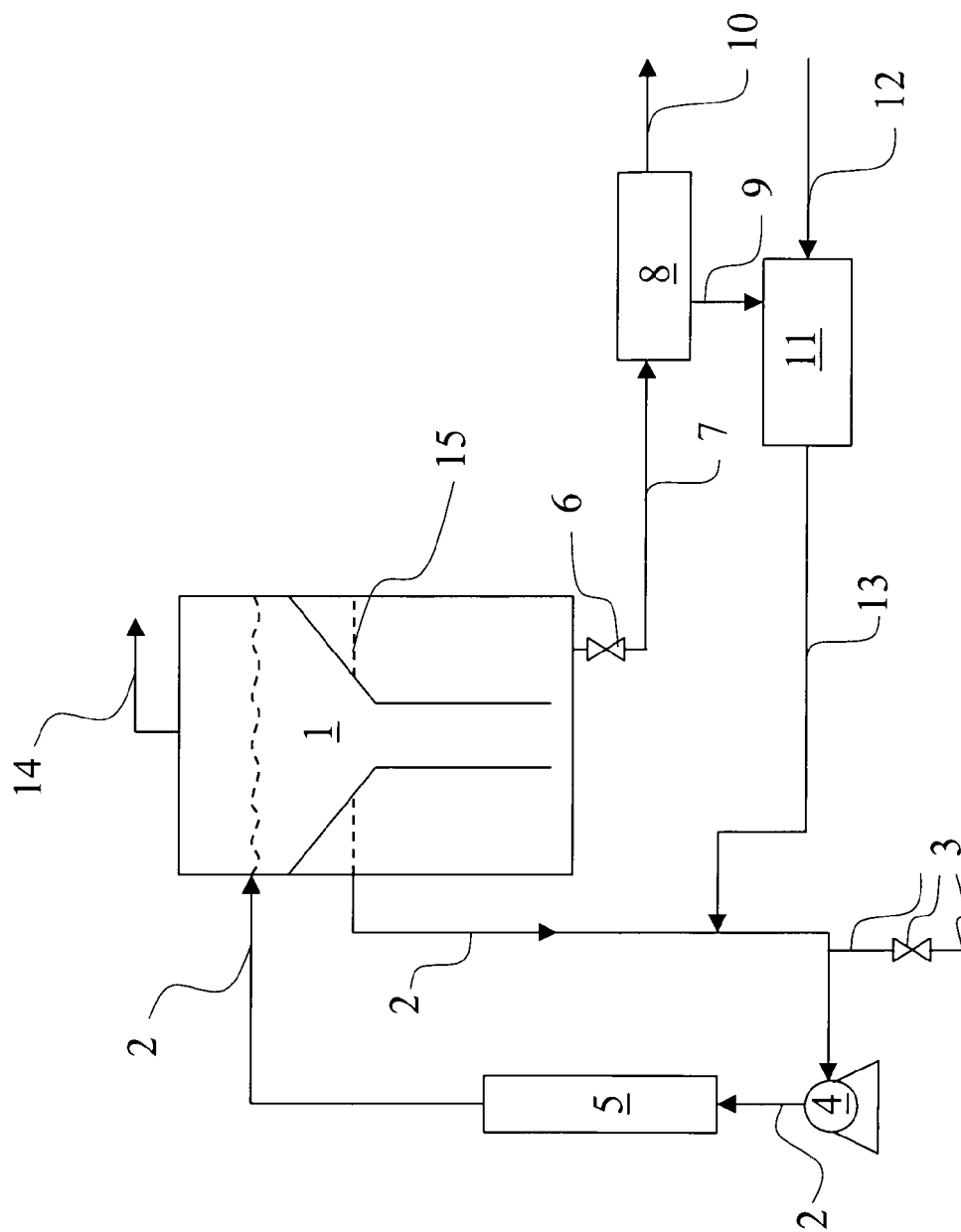
FIG. 1 is a schematic diagram of one embodiment of a process for preparing large crystal products of a crystalline product in a fluid bed crystallizer.

The Weight Percentage of Crystals (of the crystalline product) in the slurry in the External Circulation Circuit is hereinafter also referred to in abbreviation as "ECCWPC". This weight percentage of crystals is assumed to be present in all parts of the external circulation circuit where effects caused by the heat exchanger do not occur, i.e. in all parts before the heat exchanger. The weight percentage of crystals in the heat exchanger and in the external circulation circuit part after the heat exchanger will only be slightly different from the ECCWPC value. For this reason, the skilled man even will be able to allow for proper correction of the maximum and minimum values of the predetermined narrow range of the ECCWPC if the determination of the weight percentage would be done in or after the heat exchanger. Such embodiments still will be deemed to fall within the scope of the present invention, because they employ the gist of the proper invention by using simple correction methods for proper defining the ECCWPC ranges if the weight percentage of crystals is determined in the external circulation circuit in or after the heat exchanger.

As used in this application the general term "slurry properties" (or "properties of the slurry" in its broadest sense relates to any and all properties of the slurry as can be determined by any means known to the skilled man. Examples of properties of the slurry are: viscosity, density, colour, liquid content, crystal concentration, etc. It will be evident, that the skilled man, using suitable reference data with respect to any of such properties, will be easily capable of calculating the weight percentage of crystals in the slurry under investigation from any of such properties directly or indirectly.

The flow rate chosen in the external circulation circuit can be chosen within wide ranges of flow rates as are usual for the skilled man in fluid bed crystallizers. If average crystal size is larger, then generally somewhat higher flow rates are needed for keeping the crystals fluidized. The flow rate in the external circulation circuit also determines, of course also depending of the diameter of the crystallizer, the upward velocity in the crystallizer. It will be clear to the skilled man, that the specific percentage values for the maximum and minimum values in the ranges that can be applied for any specific product to be crystallized according to the invention into a large crystal product, may be different for each specific product. The skilled man will easily be able to determine such ranges for any specific product.

The ECCWPC can suitably be controlled by various methods, for instance by feeding a slurry from any part of the crystallization plant into the external circulation circuit in such way that the ECCWPC is controlled within the specified range. One of the options to do so is by adjusting the height of the crystal bed in the crystallizer in relation to the level of the outlet of the crystallizer into the external circulation circuit. The terms "fluid bed crystallizer" and "means for mechanically impacting of crystals" as used here already have been explained in the earlier parts of this application and do not need any further discussion here.

All kinds of large crystal products can be prepared according to the method of the present invention. Examples of such large crystal products are, for instance, inorganic salts (for example sodium chloride, potassium chloride, magnesium sulphate, and ammonium nitrate; or organic salts like sodium benzoate; or organic products, such as, for instance, sugar, sucrose, saccharose, or lactams, for instance ε-caprolactam, etc. The skilled man can easily establish which large crystal products can suitably be produced according to the process of the invention. In particular, however, the present invention is suitable for the production of large crystal ammonium sulphate products.

Suitable means for determining the properties of the slurry, in particular for determining whether the weight percentage of the crystals in the slurry in the external circulation circuit before the heat exchanger, falls within a specified and predetermined narrow range having a maximum and minimum value not more apart than at most 25% by weight, said narrow range falling within the range of from 1 to 50% by weight (i.e. having a lower value of from 1 to 25% by weight, with corresponding upper value of from 26 to 50% by weight, can be any such means known to the skilled man for such purpose. Such means can be applied continuously or semi-continuously, and can be applied either in off-line measurements or on-line. When off-line determinations of slurry properties are used, this can conveniently done, for instance, by regularly sampling fixed volumes of the circulated slurry in the external circuit before the heat exchanger, into a calibrated cylinder and allowing the crystals to settle for exactly 5 minutes at about the temperature level as present in the crystallizer. The volume percentage of the crystals settled after 5 minutes then can be calculated and (fluctuations therein over time, i.e. for subsequent samples) can be taken as an indication for variations in the weight percentages to be controlled within the said ranges.

Such volume percentages can easily and unequivocally be transformed into the corresponding weight percentages by taking into account the specific weights (in $kg/m^3$) of the crystals and of the saturated solution, together forming the slurry, for any specific compound for which large crystal products are to be obtained according to the invention.

Preferably, determination of the properties of the slurry is done continuously, and more preferably this is done by on-line measurements. Any on-line method of determining crystal concentration known to the skilled man can be used. For instance on-line density measurements of crystal slurries can be applied (and weight percentages of crystals then can be calculated easily taking into account the known density characteristics of the liquid phase and the crystals). Very suitably on-line light extinction measurements can be applied. Any commercially available suitable LEM equipment may be used for such purpose. Examples of LEM equipment that may be used are, for instance, the Jacoby-Tarbox (Strongsville, Ohio, US), Model A-2 Colorimeter, having 1" light path; or the McNAB incorporated (Mount Vernon, N.Y., US) Optical Concentration Transmitter, model AP-VIE.

According to the invention, the ECCWPC is controlled, for any specific large crystal product to be obtained, within a specified and predetermined narrow range having a maximum and minimum value not more apart than at most 25% by weight and falling within the range of from 1 to 50% by weight. For any such product the specific range needs to be established according to the desired properties of the large crystal product to be obtained. There may be quite some differences between the ranges for different products.

The new and unobvious process of the invention overcomes all disadvantages of the prior art processes. In this process seed crystals are formed directly (i.e. in situ) in the external circulation circuit, and thereby sticking of the seed crystals is avoided. It is to be noted, that U.S. Pat. No. 3,758,565 ('565) also addresses the production of large crystals products (in particular the production of sodium nitriloacetic acid), but said method is described for use in a circulating magma crystallizer, which is a type of crystallizer completely different from the crystallizer used in the present invention. As explicitly stated in '565, the use of an axial flow pump is not suitable in the '565 processes. Moreover, '565 does not use any control of particle size distribution or variation of the height of the crystal bed or of the weight percentage of crystals in the external circulation, but is aimed at control of bulk density of the solid final crystalline product by adjusting of the L/D-ratio of the crystals.

Preferably the crystalline product to be obtained as a large crystal product is ammonium sulphate, and the ECCWPC is controlled within a range of from 3 to 20% by weight, preferably of from 5 to 15% by weight, more preferably of from 8 to 12% by weight. The properties of the products so obtained are excellent for handling and use, e.g. as a fertilizer. Moreover, inasmuch the ranges indicated are narrower, higher yields of large crystal product are obtained.

In the process according to the invention the controlling of the ECCWPC is most preferably achieved by adjusting the height of the crystal bed in the fluid bed crystallizer. It is most preferable, that the process is carried out under relatively stable conditions as to the process conditions (e.g. heat input in heat exchanger, production level, etc.); that is to say that strong fluctuations in the production level are avoided. Adjusting of the height of the crystal bed can be done by any suitable means, for instance by adjusting the external circulation rate and/or the rate of product withdrawal through the product withdrawal line. As mentioned above, the height of the crystal bed (in cm) is calculated from the bottom of the crystallizer till the level of the boundary surface between the part of the volume of the liquid contents of the crystallizer containing almost all of the crystals and the part of the volume of the liquid contents of the crystallizer containing only very few crystals. The upper 50% of the height of the crystal bed is, in the context of this application, also referred to as the upper part of the crystal bed. The upper 50% of said upper part of the height of the crystal bed (i.e. the top 25% of the height of the crystal bed) is, in the context of this application, also referred to as the top part of the crystal bed.

Preferably, the adjusting of the height of the crystal bed in the crystallization vessel is achieved by adjusting the amount of product withdrawal through the product withdrawal line.

In the process of the invention, the inlet of the external circulation circuit is preferably at a level in the upper part of the crystal bed, most preferably at a level in the top part of the crystal bed, in the crystallization vessel and the controlling of the ECCWPC is preferably achieved by adjusting the height of the crystal bed in accordance with results of measurement of properties of the slurry in the external circulation circuit before the heat exchanger.

In the process according to the invention, the means for mechanically impacting of crystals most preferably include a circulation pump, selected from the groups of propeller pumps or centrifugal pumps, which pump is placed in the external circulation circuit and a stirrer in the crystallization vessel, and at least part of the bigger crystals in the external circulation circuit is crushed in the external circulation circuit resulting in the formation of new seed crystals. Circulation pump, selected from the groups of propeller pumps or centrifugal pumps, lead to some crushing of crystals. Other types of pumps, also-called positive displacement pumps, do not give any substantial crushing of crystals, and thus are much less suitable for being used in the process according to the invention.

It is to be noted that crushing of crystals in a pump is known in general. Reference, for instance, can be made to EP 1607380 (wherein adduct crystals of bisphenol-A are crushed in a pump). However, crushing in a pump is generally considered to be disadvantageous in crystallization processes. For instance, U.S. Pat. No. 3,662,562, teaches that pumps are to be avoided in crystallization of organic products because of the crushing effects of the pumps.

Further improvement of the process according to the invention also can be obtained by adjusting the number of revolutions of the pump so as to achieve a predetermined proportion of new seed crystals.

Of course, by adjusting the number of revolutions of the pump the height of the crystal bed will be influenced as well. The higher the number of revolutions is chosen, the higher the number of new seed crystals formed will be and the crystal bed height will become higher; the lower the number of revolutions is chosen, the lower the impact on the crystals will be and the crystal bed height will become lower. Adjustment of the number of revolutions results in effects as to the collision energy (collision impact) influenced to the crystals, and in changes of nucleation rate and seed crystal formation.

It is advantageous that the average crystal diameter of the crystals in the external circulation circuit (i.e. of the crystals for which also the ECCWPC is determined) is large enough to enable effective formation of seed crystals in the external circulation circuit. If the only crystals containing feed into the external circulation circuit is formed by the outlet from the crystallizer into the external circulation circuit, then said average diameter of the crystals will be identical to the average diameter of crystals in the crystallizer at the level of the outlet from the crystallizer into the external circulation circuit. Accordingly, the average diameter of the crystals in the external circulation circuit can be influenced by varying the height of the crystal bed in the crystallizer, while maintaining the exit to the external circulation circuit at the same level. The average crystal diameter as meant here, can be easily determined, if so desired, by measurement of the particle size distribution—according standard PSD measurements, for instance, sieve analyses according to DIN 66165 parts 1 (July 1983) & 2 (April 1987) using a vibrating screen; or DIN 4610 (April 2002) using an air jet screen—for samples taken from the external circulation circuit (e.g. of samples taken for determining ECCWPC), or in the crystallizer at the said level of outlet into the external circulation circuit. In general, formation of seed crystals in the external circulation circuit will be more effective if average crystal size is larger. Needless to say, that the values found for the average crystal diameter may be different when different particle size determination techniques are used. For any particle size determination technique, however, the average crystal diameter determined by such technique can be used as a control parameter according to the present invention. It further will be clear, that for different crystal substances different values of the most appropriate range of average crystal diameters in the external circulation circuit will need to be found.

If the large crystal product to be obtained is ammonium sulphate, the average diameter of the crystals in the external circulation circuit is preferably at least equal to 0.5 mm, more preferably at least equal to 0.75 mm, even more preferably at least equal to 1 mm, and most preferably at least equal to 1.5 mm.

Furthermore, and again if the large crystal product to be obtained is ammonium sulphate, the average diameter of the crystals withdrawn through the product line is preferably at least equal to 1.5 mm, more preferably at least equal to 1.75 mm, even more preferably at least equal to 2 mm, and most preferably at least equal to 2.5 mm.

In a very preferred embodiment of the process of the invention ammonium sulphate is produced in such manner that the average diameter of the crystals in the external circulation circuit is at least equal to 1 mm, and the average diameter of the crystals withdrawn through the product line is at least equal to 2 mm.

Most preferably, for such process of producing ammonium sulphate, the average diameter of the crystals in the external circulation circuit is at least equal to 1.5 mm, and the average diameter of the crystals withdrawn through the product line is at least equal to 2.5.

The average diameter of the crystals withdrawn through the product line can be determined easily by sampling portions of the outlet of the crystallizer through the product withdrawal line, and by determining the PSD of the crystals therein by any standard method. It is even more convenient to determine the PSD of the product after solid/liquid separation, e.g. by centrifuge, of the product withdrawn through the product withdrawal line. Such determining of PSD of the crystals is preferably done at regular intervals of time and is then advantageously used, if the average crystal diameter deviates at any of such intervals from the desired average diameter of the large crystal product to be obtained, for adjustment of the set-point of the means for determining properties of the slurry to any specific value appropriately chosen within a specified and predetermined narrow range, provided that these means are equipped to keep such set-point. Preferably, this set-point is adjusted at regular intervals of at least 1 hour apart, preferably at least 4 hours apart, and most preferably on average about 8 hours apart, whereby the adjustment of the set-point is done according to feed-back control on the basis of the actual average diameter of the crystals withdrawn through the product line as determined at the regular interval chosen.

In a particularly preferred embodiment of the invention, the average diameter of the crystals withdrawn through the product line is further subjected to a screening process, using at least one screen or one screening step, for fine-tuning the crystal size distribution of the large crystal product prepared to market demands. According to this preferred embodiment of the invention it will be possible to achieve best possible fine-tuning of the large crystal product crystal size specifications according to market demands, without loosing too much product or overall efficiency in achieving the overall large crystal product yield.

Most preferably, this screening leads to at least two fractions A and B, of which fractions the fraction with the smallest crystals, fraction A, is a fraction having a maximum diameter of the crystals at a predetermined value of $X_1$ mm, and fraction B is the desired product fraction for which—if the large crystal product is ammonium sulphate—at least 80% by weight, preferably at least 90% by weight, and most preferably at least 95% by weight, has a diameter larger than said predetermined value of $X_1$ mm. For instance for the large crystal ammonium sulphate product, the value of $X_1$ mm is generally in the range of from 1.0 to 1.4 mm. The percentages as shown here specifically for ammonium sulphate may be different for different substances; the lowest values may even be as low as at least 50% by weight for some other products; similarly for other products percentages of at least 98% by weight may be attainable. It is an aim of the present invention, that the yield of the desired product fraction (B) is as high as possible.

Fraction (B) may be subjected to further screening whereby largest particles in the fraction are substantially removed as well, so as to restrict the amount of oversized product and to better fulfill market specifications for the large crystal product. The invention is now further illustrated by means of an explanation of the equipment shown in FIGS. 1 and 2. The embodiment of FIG. 2 is a very preferred embodiment.

In these figures:
[1] Represents a fluid bed crystallizer vessel; the top level of the liquid content of the crystallizer is shown by means of a non-straight, indented line.
[2] Represents an external circuit line, which together with pump [4] and heat exchanger [5], forms an external circulation circuit comprising an outlet line, at a level corresponding to the level of the indented straight line shown in the crystallizer, and an inlet line generally at about the level of the indented non-straight line. It is to be noted that said indented straight line preferably will be within the part of the crystallizer contents belonging to the upper 50% of the fluid crystal bed (the height of which, calculated from the bottom of the crystallizer, is not shown in the figures). The straight indented line, more preferably, falls within the top 25% of the of the fluid crystal bed.
[3] Represents the means for determining properties of the slurry in the external circulation circuit, especially for measurement of amount of solid in the external circuit. More specifically, [3] represents in FIG. 1 an off-line sampling point (where such property determinations can be done continuously or semi-continuously after proper sampling); [3] represents in FIG. 2 the combined configuration of an on-line measurement apparatus and pertaining control line, namely a line connecting the suction side and the head of circulation pump [4], which line passes through an on-line measurement device (for instance a Light Extinction Measurement (LEM) apparatus) which is controlling the valve [6] in product withdrawal line [7].
[4] Represents a circulation pump selected from the groups of propeller pumps or centrifugal pumps.
[5] Represents a heat exchanger.
[6] Represents a control valve for the product withdrawal line [7].
[7] Represents the product withdrawal line.
[8] Represents equipment for solid/liquid separation, for instance a centrifuge.
[9] Represents a filtrate line.
[10] Represents the line for collecting the large crystal product in solid form. Optionally a drying operation and a screening operation is included in this line.
[11] Represents a mother liquor vessel.
[12] Represents the feed to the mother liquor vessel [11].
[13] Represents the feed line to the fluid bed crystallizer [1].
[14] Represents a vapor outlet line.
[15] Represents the level of the outlet line to the external circulation circuit [2].

Moreover, the following example and comparative example prove the favorable effects of the process of the present invention.

Figure 2:
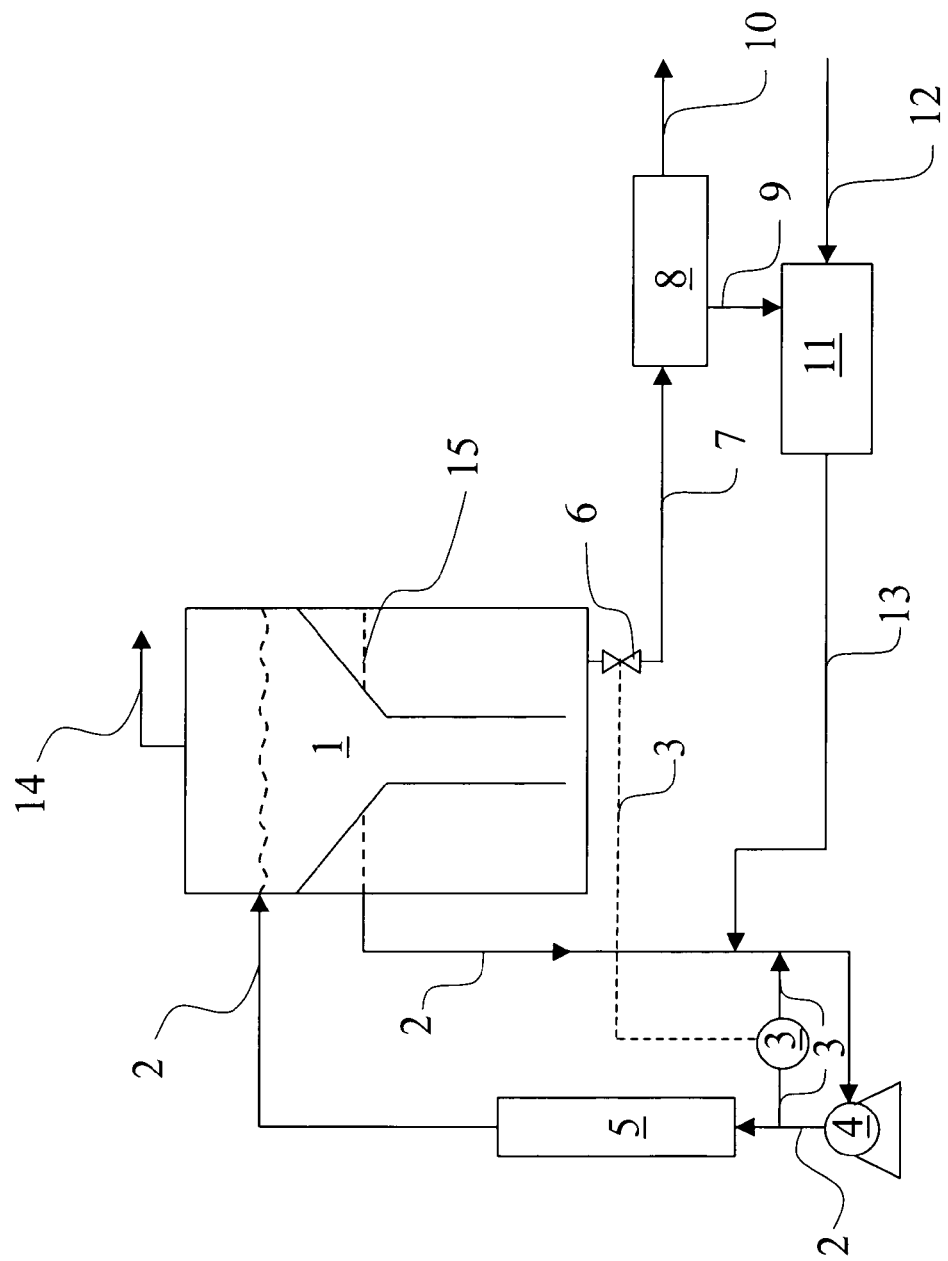
FIG. 2 is a schematic diagram of another embodiment of a process for preparing large crystal products of a crystalline product in a fluid bed crystallizer.

In the comparative example, ammonium sulphate product crystals were produced in industrial-scale production equipment resembling the configuration as schematically depicted in FIG. 1 or 2 (but without presence of the means for determining the properties of the slurry in the external circulation circuit [3]). For the example (according to the invention) the configuration of FIG. 2 was used.

COMPARATIVE EXAMPLE

A 500-m3 fluid bed crystallizer [1] of the Oslo type was used with an external circulation circuit for circulating the slurry from vessel [1] via line [2], a pump [4] and a heat exchanger [5]. The pump was a Begemann impeller pump, capacity 4000 m³/hour. The crystallizer was operated by evaporation at a temperature of 110° C. and at a pressure of $10^5$ kPa. In the vessel [1] 330 m³ of aqueous crystal slurry was present comprising ammonium sulphate crystals in a saturated ammonium sulphate solution in water. The suspended crystal mass comprised a crystal bed in the lower part of the vessel [1] in which the concentration of crystals in the slurry was in the range of from about 40 to about 50 wt. %. Ammonium sulphate feed solution, which was obtained as a by-product in a production process for caprolactam, and which comprised ammonium sulphate dissolved in water (40 wt. % ammonium sulphate with respect to the solution) was introduced to the suspended crystal mass via lines [12] and [13] into the external circulation circuit [2] of the crystallizer. Product slurry comprising ammonium sulphate product crystals in ammonium sulphate solution was withdrawn from the vessel via valve [6] and line [7]. The ammonium sulphate product crystals were separated from the product slurry using a centrifuge [8] and a drier (not shown in the figures). The dried ammonium sulphate crystals were size classified using a screening installation. The ammonium sulphate solution which was separated from the crystals by centrifuge [8] was recycled to the suspended crystal mass via line [9]. The flow rate of the ammonium sulphate feed solution in line [13] was 35 tons/hour, including 10 tons/hour of ammonium sulphate solution through line [9]. The flow rate of the product slurry [7] was 20 tons/hour. The crystal concentration in the product slurry was 50 wt. %.

A slurry comprising ammonium sulphate crystals in ammonium sulphate solution was withdrawn from the vessel [1] via line [2], and recirculated to the suspended crystal mass in [1] via pump [4], and via heat exchanger [5]. The flow rate of the slurry withdrawn via line [2] was 3600 m$^3$/hour.

In this comparative example the crystallization process was carried out without using any means for determining the properties of the slurry in the external circulation circuit for controlling the large crystal product to be obtained through valve [6]. The flow rate of the slurry withdrawn via line [2] was kept at 3600 m$^3$/hour, and the flow rate of the product slurry [7] was kept at 20 tons/hour. Average crystal diameter of the large crystal product in line [7] was determined, after centrifuge [8], by means of PSD measurement (sieve analyses according to DIN 66165 parts 1 (July 1983) & 2 (April 1987) using a vibrating screen) at regular 8-hour intervals for a period of 4 weeks. A rather cyclically fluctuating behavior of the average crystal diameter was observed, though the diameter on average was at about 1.5 mm over the 4-weeks' period. Results are shown (see "without LEM control" data) in tables 1 and 2, for products, as they would be distinguished respectively according to American or European specifications.

EXAMPLE

In the embodiment according to the invention the equipment as used in the comparative example was transformed into the equipment configuration as depicted in FIG. 2, by installing means for determining the properties of the slurry in the external circulation circuit [3] for controlling the large crystal product to be obtained through valve [6]. The concentration of the crystals in the slurry withdrawn from vessel [1] into the external circulation circuit was continuously measured using, a Jacocby-Tarbox model A-2 Colorimeter as a Light Extinction Measurement (LEM) device [3]. The start of the process was done under the same conditions as in the comparative example, but initially using a tentative set-point of the LEM device of 50 scale units. The desired average crystal diameter of the large crystal product in line [7] was 2.1 mm. Sampling of the crystal diameter of the large crystal product in line [7] was determined by means of PSD measurement (sieve analyses according to DIN 66165 parts 1 (July 1983) & 2 (April 1987) using a vibrating screen), after centrifuge [8], at regular 8-hour intervals for a period of 4 weeks. After each interval of sampling, the set-point of the LEM measurement was adjusted upwardly (if diameter of the large crystal product in line [7] was above the desired diameter value), or downwardly (if diameter of the large crystal product in line [7] was below the desired diameter value). In the experimental run performed, after the first sampling a crystal diameter of 1.8 mm was found and the set-point of the LEM measurement was adjusted to 40 scale units. The next sampling (again 8 hours) a crystal diameter of 2.3 mm was found and the set-point of the LEM measurement was adjusted to 45 scale units. Adjusting of the set-point of the LEM measurement was continued every 8 hours according to results of the measurements of the diameter of the large crystal product in line [7]. After few iterations a relatively stable set-point (at about 47 scale units) was reached, and almost no fluctuation of the diameter of the large crystal product in line [7], about 2.1 mm, was found in the subsequent 8-hour samplings. According to the process of the invention, the crystal diameter of the large crystal product in line [7] could be kept at the desired value by changing the product flow [7] out of the crystallizer under continuous control of the LEM measurement for at least 4 weeks. No cyclically fluctuating behavior of the average crystal diameter was observed anymore, and the diameter of the obtained crystals remained stable at about 2.1 mm. Results are shown (see "with LEM control" data) in tables 1 and 2, for products respectively according to American or European specifications.

TABLE 1

Crystal fractions without and with LEM control; reference: US specs

| | Weight fraction of crystals in the outlet of the crystallizer | | |
|---|---|---|---|
| | <1.0 | 1.0-3.35 mm | >3.35 mm |
| Without LEM control (Comparative) | 60 | 40 | 0 |
| With LEM control (Invention) | 14 | 85 | 1 |

TABLE 2

Crystal fractions without and with LEM control; reference: European specs

| | Weight fraction of crystals in the outlet of the crystallizer | | |
|---|---|---|---|
| | <1.4 mm | 1.4-3.35 mm | >3.35 mm |
| Without LEM control (Comparative) | 70 | 30 | 0 |
| With LEM control (Invention) | 20 | 75 | 5 |

Comparing the results with and without LEM control it can be seen that the product output of the crystallizer in the desired product range (1.0 till 3.35 mm; or 1.4 till 3.35 mm, respectively for US and European specs) is more than doubled.

The invention claimed is:

1. Continuous process for preparing large crystal products of a crystalline product in a fluid bed crystallizer, said fluid bed crystallizer comprising a crystallization vessel and means for mechanically impacting of crystals; and connected to the crystallization vessel (i) a feed line; (ii) an external circulation circuit comprising means for determining the properties of the slurry in the external circulation circuit and a heat exchanger; and (iii) a product withdrawal line, said process being characterized in that, for any specific crystalline product and at any flow rate chosen in the external circulation circuit, the weight percentage of crystals of the crystalline product in the slurry in the external circulation circuit, ECCWPC, before the heat exchanger, is controlled by said means for determining properties of the slurry within a specified and predetermined narrow range having a maximum and minimum value not more apart than at most 25% by weight and falling within the range of from 1 to 50% by weight.

2. Process according to claim 1, wherein
the crystalline product is ammonium sulphate, and wherein the ECCWPC is controlled within a range of from 3 to 20% by weight, preferably of from 5 to 15% by weight, more preferably of from 8 to 12% by weight.

3. Process according to claim 1, wherein
the crystallization vessel comprises a crystal bed, and wherein the controlling of the ECCWPC is achieved by adjusting the height of the crystal bed.

4. Process according to claim 3, wherein
the adjusting of the height of the crystal bed in the crystallization vessel is achieved by adjusting the amount of product withdrawal through the product withdrawal line.

5. Process according to claim 1, wherein
the inlet of the external circulation circuit is at a level in the upper part of the crystal bed, preferably at a level in the top part of the crystal bed, in the crystallization vessel, and wherein the controlling of the ECCWPC is achieved by adjusting the height of the crystal bed in accordance with results of measurement of properties of the slurry in the external circulation circuit.

6. Process according to claim 1, wherein
the means for mechanically impacting of crystals include a circulation pump, selected from the groups of propeller pumps or centrifugal pumps, which pump is placed in the external circulation circuit and a stirrer in the crystallization vessel, and wherein at least part of the bigger crystals in the external circulation circuit is crushed in the external circulation circuit resulting in the formation of new seed crystals.

7. Process according to claim 6, wherein
the number of revolutions of the pump is adjusted to achieve a predetermined proportion of new seed crystals.

8. Process according to claim 1, wherein
the large crystal product to be obtained is ammonium sulphate, and wherein
the average diameter of the crystals in the external circulation circuit is at least equal to 0.5 mm.

9. Process according to claim 8, wherein
the average diameter of the crystals in the external circulation circuit is at least equal to 1.5 mm.

10. Process according to claim 1, wherein
the large crystal product to be obtained is ammonium sulphate, and wherein
the average diameter of the crystals withdrawn through the product line is at least equal to 1.5 mm.

11. Process according to claim 10, wherein
the average diameter of the crystals withdrawn through the product line is at least equal to 2 mm.

12. Process according to claim 8, wherein
ammonium sulphate is produced and wherein
the average diameter of the crystals in the external circulation circuit is at least equal to 1 mm, and wherein
the average diameter of the crystals withdrawn through the product line is at least equal to 2 mm.

13. Process according to claim 9, wherein
the average diameter of the crystals in the external circulation circuit is at least equal to 1.5 mm, and the average diameter of the crystals withdrawn through the product line is at least equal to 2.5 mm.

14. Process according to claim 1, wherein
the means for determining properties of the slurry within a specified and predetermined narrow range are equipped to keep a set-point, and wherein this set-point is adjusted to any specific value appropriately chosen within said predetermined range, at regular intervals of at least 1 hour apart, whereby the adjustment of the set-point is done according to feed-back control on the basis of the actual average diameter of the crystals withdrawn through the product line as determined at the regular interval chosen.

15. Process according to claim 14, wherein
the said set-point is adjusted at regular intervals of on average about 8 hours apart.

16. Process according to claim 1, wherein
the average diameter of the crystals withdrawn through the product line is further subjected to a screening process, using at least one screen or one screening step, for fine-tuning the crystal size distribution of the large crystal product prepared to market demands.

17. Process according to claim 16, wherein
the screening leads to at least two fractions A and B, of which fractions the fraction with the smallest crystals, fraction A, is a fraction having a maximum diameter of the crystals at a predetermined value of $X_1$ mm, and fraction B is the desired product fraction for which—if the large crystal product is ammonium sulphate—at least 80% by weight has a diameter larger than said predetermined value of $X_1$ mm.

18. Process according to claim 17, wherein
fraction B—if the large crystal product is ammonium sulphate—is at least 90% by weight.

19. Process according to claim 18, wherein
fraction B—if the large crystal product is ammonium sulphate—is at least 95% by weight.

* * * * *